(12) United States Patent
Dalluge et al.

(10) Patent No.: US 7,661,650 B2
(45) Date of Patent: *Feb. 16, 2010

(54) COLLET BIASING DEVICE FOR VALVE ACTUATOR

(75) Inventors: Paul R. Dalluge, Marshalltown, IA (US); Paul A. Day, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 327 days.

This patent is subject to a terminal disclaimer.

(21) Appl. No.: 11/553,700

(22) Filed: Oct. 27, 2006

(65) Prior Publication Data
US 2008/0099702 A1 May 1, 2008

(51) Int. Cl.
*F16K 31/12* (2006.01)
(52) U.S. Cl. .......................... 251/58; 251/62; 251/231; 251/242
(58) Field of Classification Search .................. 251/58, 251/62, 231, 236, 242
See application file for complete search history.

(56) References Cited

U.S. PATENT DOCUMENTS 3,727,837 A 4/1973 Gazzera et al.
3,985,151 A 10/1976 Smith
5,176,464 A * 1/1993 Tanner ................ 403/370
5,924,671 A * 7/1999 Baumann ................ 251/62
6,062,534 A * 5/2000 Eggleston ................ 251/58
6,076,799 A * 6/2000 Baumann ................ 251/62
6,857,448 B2 * 2/2005 Schwartzman ........ 137/625.18

FOREIGN PATENT DOCUMENTS

GB 2 136 541 A 9/1984
WO WO-2005/124211 A1 12/2005

OTHER PUBLICATIONS

Written Opinion and International Search Report for PCT/US2007/079551, dated May 3, 2008.

* cited by examiner

*Primary Examiner*—John K Fristoe, Jr.
(74) *Attorney, Agent, or Firm*—Marshall, Gerstein & Borun LLP

(57) ABSTRACT

A valve actuator comprises a housing, a lever, a collet, and a biasing device. The lever is disposed within the housing and is adapted to be operatively coupled to rotate the valve shaft. The collet is carried by the lever and adapted to couple the lever to the valve shaft. The biasing device comprising a spring operatively coupled to the collet to bias the lever into a predetermined position.

21 Claims, 4 Drawing Sheets

COLLET BIASING DEVICE FOR VALVE ACTUATOR

FIELD OF THE DISCLOSURE

The present disclosure relates to a valve actuator and, more particularly, a collet biasing device for a valve actuator.

BACKGROUND

FIG. 1 depicts one typical rotary valve actuator 100. The rotary valve actuator 100 generally includes a housing 102 and a drive assembly 104. A portion of the housing 102 is removed, thereby exposing the drive assembly 104, which is partly broken away for purposes of description.

The housing 102 includes a generally cylindrical body portion 106 and a pair of opposing cover plates 108a, 108b. The drive assembly 104 includes a diaphragm subassembly 110, shown in cross-section, and a lever subassembly 112. The diaphragm subassembly 110 generally includes an upper housing 114 containing a diaphragm 116, a diaphragm rod 118, and a pair of springs 119. The springs 119 bias the diaphragm 116 into the position depicted. The diaphragm 116 is operably coupled to the diaphragm rod 118 to displace the diaphragm rod 118 against the springs 119 in response to a pressure change in the upper housing 114. The diaphragm rod 118, in turn, actuates the drive assembly 104.

The drive assembly 104 includes a lever 122, a collet 124, and a draw nut 125. The lever 122 includes a body portion 126 and a yoke portion 128. The yoke portion 128 operatively couples the lever 122 to the diaphragm rod 118. The body portion 126 includes a bore 127 defined, at least partly, by a generally cylindrical central portion 126a and a generally frustoconical receiver portion 126b.

The collet 124 is a generally rod-shaped member disposed within the bore 127 of the body portion 126 of the lever 122 and is adapted for axial displacement relative to the lever 122. The collet 124 includes a plurality of collet fingers 134 and a threaded portion 136. The draw nut 125 threadably engages the threaded portion 136 to secure the collet 124 within the lever 122. The collet fingers 134 have outer surfaces 134a shaped and configured to slidably engage the receiver portion 126b of the lever 122 and inner surfaces 134b shaped and configured to engage a rotary valve shaft 138, which is disposed between the collet fingers 134.

Thus, during assembly, the draw nut 125 is tightened on the threaded portion 136 of the collet 124, thereby drawing the collet 124 to the left relative to the orientation of the actuator 100 depicted in FIG. 1. This causes the collet 124 to slidably displace relative to the body portion 126 of the lever 122. Simultaneously, sliding engagement between the receiver portion 126b and the outer surfaces 134a of the collet fingers 134 causes the collet fingers 134 to displace radially inwardly, thereby wedging between the receiver portion 126b and the valve shaft 138. Continued tightening of the draw nut 125 further displaces the collet 124 to further wedge the collet fingers 134 and secure the assembly 104 to the valve shaft 138.

While the above-described configuration may effectively couple such rotary valve shafts 138 to such actuators 100, they are vulnerable to certain inefficiencies. For example, overdrawing the collet 124 can displace the collet 124 away from the valve shaft 138. This displacement can generate tension on the valve shaft 138. Tension applied to the valve shaft 138 may lead to an offsetting of the valve control element (not shown), which may include, for example, a butterfly valve control element, thereby affecting the quality, life expectancy, or leakage of any seal created thereby. Furthermore, overdrawing the collet 124 can displace the lever 122 toward the valve shaft 138 and into engagement with the housing 102, thereby leading to metal to metal contact, which generates friction and affects the performance of the actuator 100.

SUMMARY

One embodiment of the present disclosure provides a valve actuator for being coupled to a valve shaft. The valve actuator generally comprises a housing, a lever, a collet, and a biasing device. The lever is disposed within the housing and adapted to be operatively coupled to rotate the valve shaft. The lever carries the collet, which is adapted to couple the lever to the valve shaft. The biasing device is operatively coupled to the collet and adapted to bias the lever into a predetermined position away from the valve shaft.

In furtherance of this embodiment, the biasing device comprises a spring is disposed between and engaging a portion of the collet and the valve shaft.

Accordingly, in one embodiment, the collet comprises a recess formed in an axial end thereof. The recess receives at least a portion of the spring and a portion of the valve shaft.

Additionally, to couple the lever to the valve shaft, the collet comprises a plurality of collet fingers. The plurality of collet fingers are disposed adjacent the recess that receives the biasing device.

To enable the positioning device to position the lever, the lever comprises an axial dimension that is smaller then a dimension of the housing such that the positioning device can displace the lever within the housing via the collet. Thus, the collet is disposed within an elongated bore with the lever.

Another embodiment of the present disclosure comprises a method of positioning a lever in a housing of a valve actuator. Specifically, in the disclosed example, the method applies to a lever that contains a collet having a plurality of collet fingers adapted to radially engage and secure a valve shaft. The method generally comprises positioning the valve shaft between the plurality of collet fingers and in engagement with a spring. The spring is disposed within a recess in the end of the collet. The spring therefore biases the lever away from the rotary valve shaft and into a predetermined position. Then, the collet is drawn away from the valve shaft through the lever. In the disclosed embodiment, this causes the collet fingers to slidably engage a frustoconical surface within the lever and radially displace into engagement with the valve shaft.

DETAILED DESCRIPTION

Figure 1:
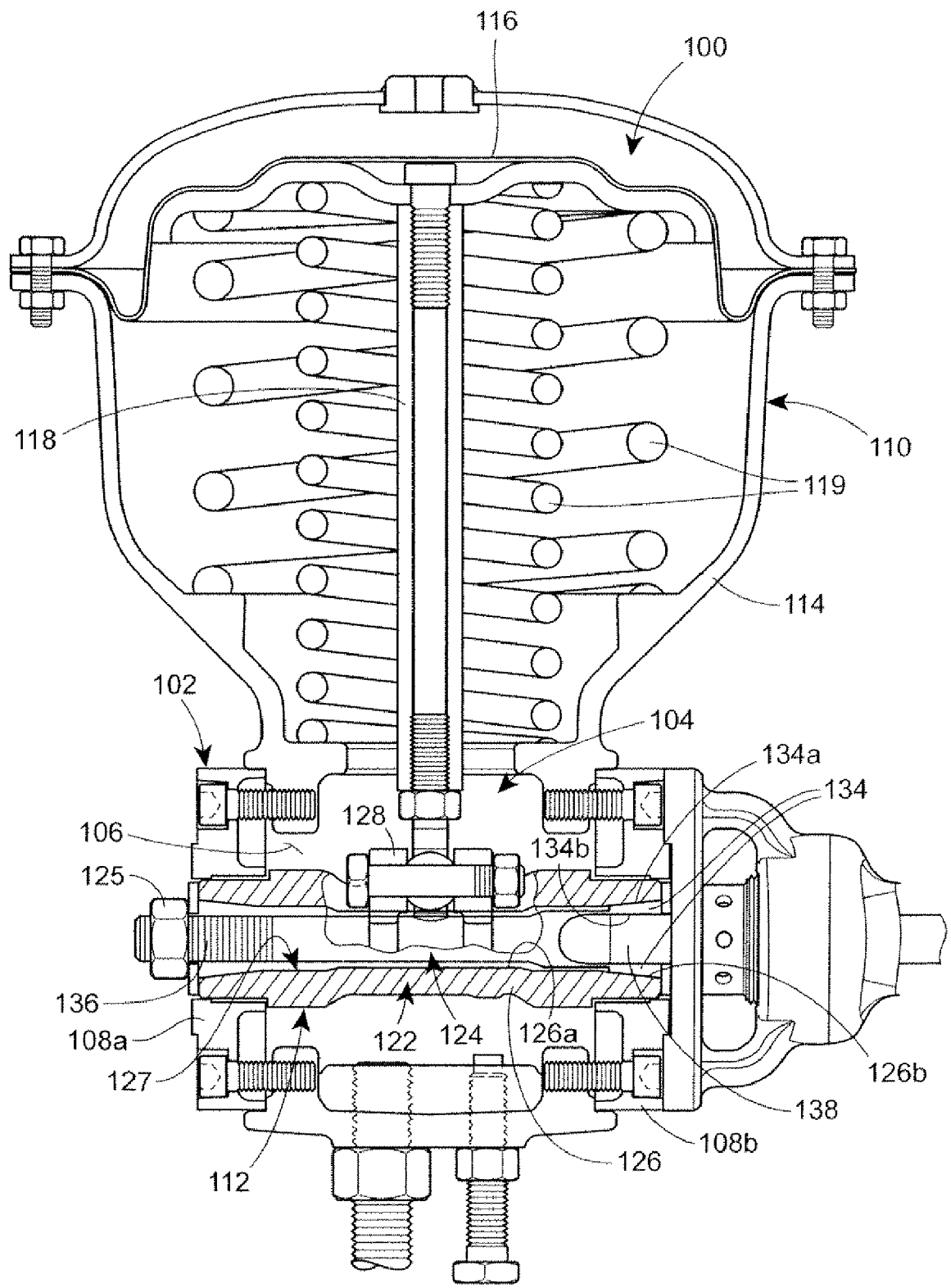
FIG. 1 is a cross-sectional, partially broken away side view of one conventional rotary valve actuator.
Figure 2:
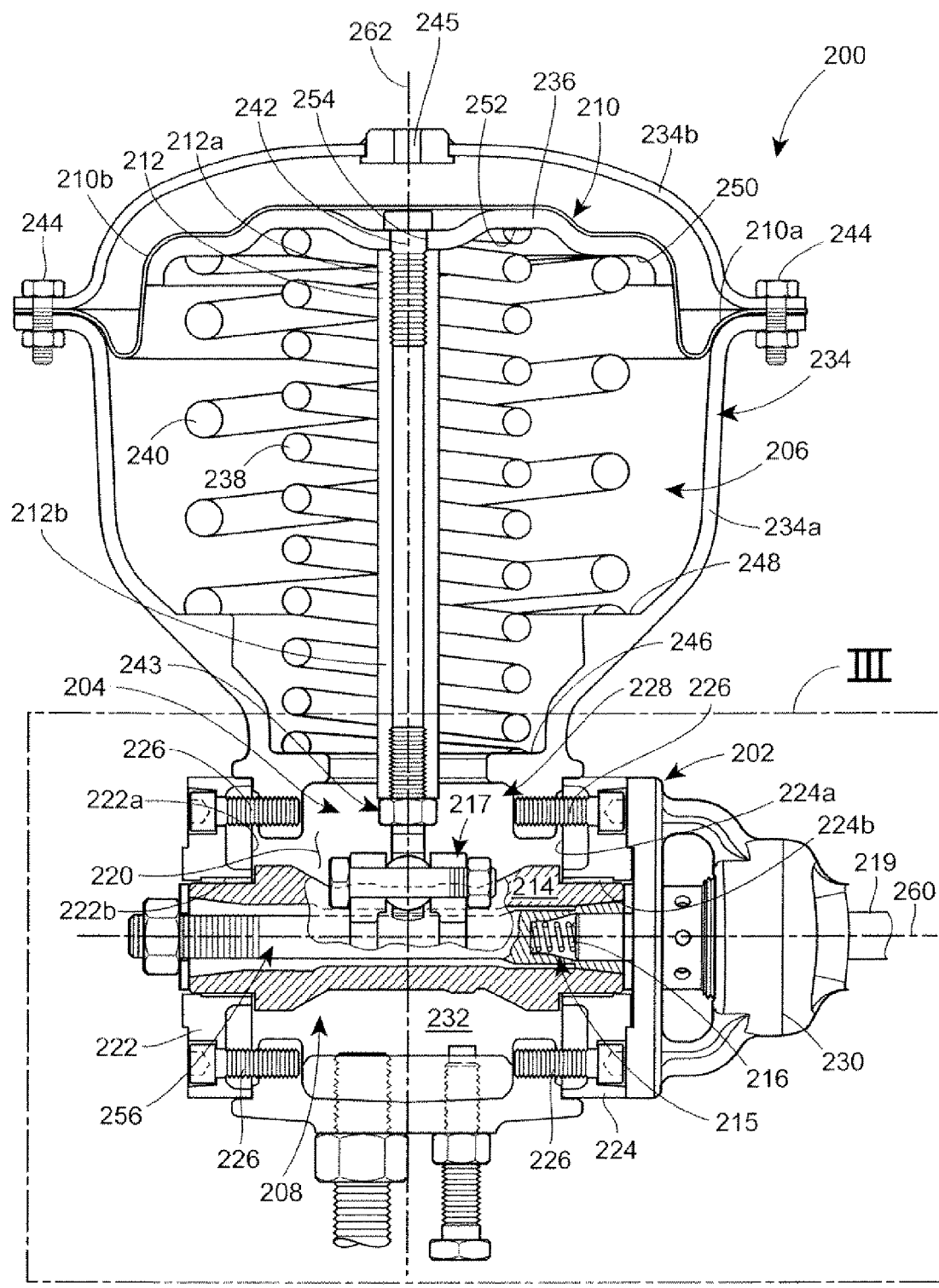
FIG. 2 is a cross-sectional, partially broken away side view of a rotary valve actuator including a collet biasing device constructed according to the principles of the present disclosure.

FIG. 2 depicts a rotary valve actuator 200 constructed in accordance with the principles of the present disclosure. The rotary valve actuator 200 generally includes a housing 202 and a drive assembly 204. The drive assembly 204 of the depicted embodiment includes a diaphragm subassembly 206 and a lever subassembly 208. The diaphragm subassembly 206 generally includes a diaphragm 210 operatively coupled to a diaphragm rod 212 for actuating the lever subassembly 208. The lever subassembly 208 includes a lever 214, a collet 256, and a collet biasing device 215. In the disclosed example, the collet biasing device 215 comprises a coil spring 216 in operative engagement with the collet 256. The diaphragm rod 212 is operatively coupled to the lever 214 and adapted to drive a rotary valve shaft 219 of a rotary valve (not shown). During assembly, the collet biasing device 215 biases the collet 256, and therefore the lever 217 toward a predetermined position within the housing 202, thereby ensuring that the lever 214 can rotate as desired in response to displacement of the diaphragm rod 212.

With continued reference to FIG. 2 the housing 202 of the actuator 200 of the present embodiment includes a generally cylindrical body 220, a first cover plate 222, a second cover plate 224, and a plurality of threaded fasteners 226. The cylindrical body 220 defines an opening 228 through a side thereof. The first cover plate 222 includes a generally flat plate having an inner surface 222a and defining a cylindrical bore 222b. The second cover plate 224 similarly includes a generally flat plate having an inner surface 224a aid defining a cylindrical bore 224b. Additionally, the second cover plate 224 is adapted to receive a mounting yoke 230 (partially shown) of the rotary control valve. The mounting yoke 230 is integral to the rotary valve and is adapted to receive the rotary valve shaft 219 and mount the valve actuator 200 to the rotary valve with threaded fasteners (not shown) or any other suitable attachment means known to those skilled in the art. Additionally, the threaded fasteners 226 secure the first and second cover plates 222, 224 to the cylindrical body 220, thereby defining a cavity 232 therein.

As stated above, the drive subassembly 204 includes the diaphragm subassembly 206 and the lever subassembly 208. The diaphragm subassembly 206 is attached to the housing 202 via the opening 228 in the cylindrical body 220. The cavity 232 defined by the housing 202 contains the lever subassembly 208.

The diaphragm subassembly 206 generally includes the diaphragm 210 and the diaphragm rod 212. Additionally, the diaphragm subassembly 206 includes a housing 234, a diaphragm plate 236, a first compression spring 238) a second compression spring 240, a threaded fastener 242, and a rod end-bearing 243. The housing 234 includes an upper housing 234a and a diaphragm casing 234b secured together by a plurality of cap screws 244. The diaphragm casing 234b defines an inlet port 245 adapted to be connected to a pressure source such as a pneumatic line. The upper housing 234a is generally cup-shaped and includes a lower shelf portion 246 and an upper shelf portion 248. The upper housing 234a contains a majority of the remainder of the diaphragm subassembly 206.

As mentioned above, the diaphragm 210 is operatively coupled to the diaphragm rod 212. More specifically, the diaphragm plate 236 couples the diaphragm 210 to the diaphragm rod 212. The diaphragm plate 236 is a contoured circular plate having an outer annual surface 250, an inner annular surface 252, and a central aperture 254. In the embodiment depicted in FIG. 2, the central aperture 254 is disposed in a countersunk central region of the diaphragm plate 236. The diaphragm rod 212 includes a hollow cylindrical rod having a first end 212a and a second end 212b. The threaded fastener 242 is disposed through the central aperture 254 in the diaphragm plate 236 and threadably attaches to the first end 212a of the diaphragm rod 212. This secures the diaphragm plate 236 to the diaphragm rod 212.

The diaphragm 210 includes a relatively flexible disk-shaped member having an outer disk portion 210a and an inner disk portion 210b. In one embodiment, the diaphragm 210 is constructed of a fabric. However, in alternate embodiments, the diaphragm 210 may be constructed of a polymer or any other material or combination of materials capable of serving the principles of the present disclosure. The outer disk portion 210a is secured between the diaphragm casing 234b and the upper housing 234a. The inner disk portion 210b is disposed above the diaphragm plate 236 and may be secured to the diaphragm plate 236 in numerous ways known to one skilled in the art. In an alternative embodiment, the inner disk portion 210b of the diaphragm 210 is not secured to the diaphragm plate 236 at all, but rather, merely gravitationally engages the diaphragm plate 236.

The first and second compression springs 238, 240 are concentrically disposed around the diaphragm rod 212 and between the diaphragm plate 236 and the upper housing 234a. In the depicted embodiment, the first compression spring 238 has a diameter that is smaller than a diameter of the second compression spring 240. The first compression spring 238 is axially disposed between the lower shelf portion 246 of the upper housing 234a and the inner annular surface 252 of the diaphragm plate 236. The second compression spring 240 is axially disposed between the upper shelf portion 248 of the upper housing 234a and the outer annular surface 250 of the diaphragm plate 236. Accordingly, the first and second compression springs 238, 240 bias the diaphragm plate 236, the diaphragm rod 212, and the diaphragm 210 into the position illustrated in FIG. 2.

During operation of the diaphragm subassembly 206, a pressure is introduced into the housing 234 via the inlet port 245. As the pressure increases between the diaphragm 210 and the diaphragm casing 234b, the pressure forces the diaphragm 210 and diaphragm plate 236 downward relative to the orientation of the actuator 200 depicted in FIG. 2. Accordingly, the diaphragm rod 212 displaces downward. Upon the release or removal of pressure from between the diaphragm casing 234b and the diaphragm 210, the first and second compression springs 238, 240 bias the diaphragm 210, diaphragm plate 236, and diaphragm rod 212 back to the position depicted in FIG. 2. The displacement of the diaphragm subassembly 206 is transferred to the lever subassembly 208 via the rod end-bearing 243, as will be described in further detail below.

As stated above, the lever subassembly 208 generally includes the lever 214, the collet 256, and the collet biasing device 215. Additionally, with reference to FIGS. 2 and 3, the lever subassembly 208 includes a lever yoke 217 and a draw nut 258. The lever 214 includes an axis 260 (shown in FIG. 2), which is substantially perpendicular to an axis 262 (shown in FIG. 2) of the diaphragm rod 212. The lever yoke 217 is operatively attached to the diaphragm rod 212 via the rod end-bearing 243 to transfer linear displacement of the diaphragm rod 212 along axis 262 (shown in FIG. 2) into rotational displacement of the lever 214 about axis 260 (shown in FIG. 2).

Figure 3:
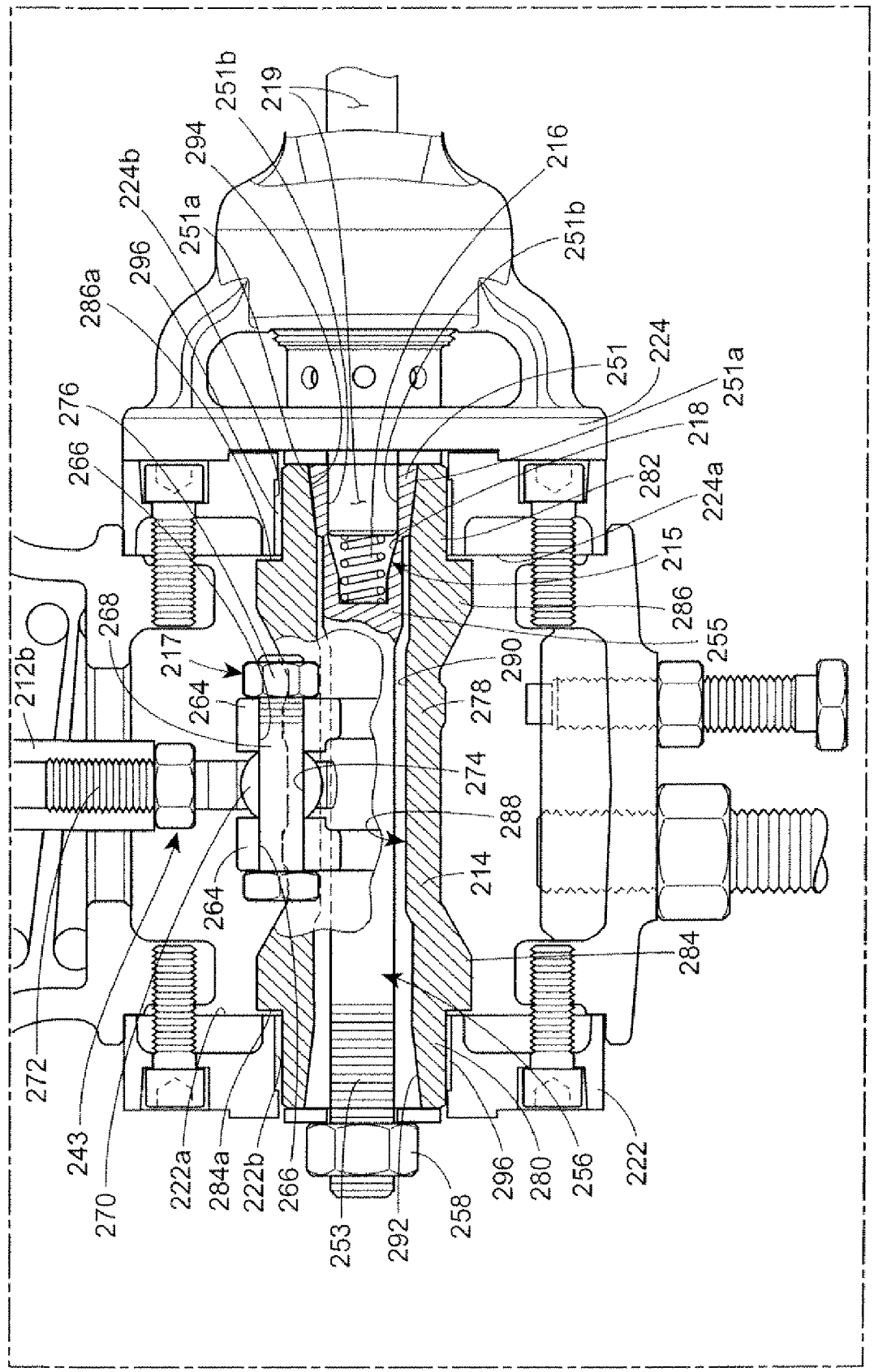
FIG. 3 is a partial side view of the actuator of FIG. 2 taken from box III of FIG. 2.

More specifically, as depicted in FIG. 3, the lever yoke 217 includes a pair of flanges 264 that extend radially outward from the lever 214. The flanges 264 each include an aperture 266 receiving a bolt 268. The rod end-bearing 243 includes a spherical ball 270 and a threaded shaft 272. The threaded shaft 272 is threaded into the second end 212b of the diaphragm rod 212. The spherical ball 270 includes a cylindrical bore 274 therethrough. The cylindrical bore 274 receives the bolt 268 disposed through the apertures 266 in the flanges 264 of the lever yoke 217. A nut 276 is threaded onto an end of the bolt 268 thereby operatively securing the diaphragm rod 212 to the lever 214.

The lever 214 includes a generally hollow cylindrical member having a central body portion 278, a first end portion 280, a second end portion 282, a first collar portion 284, and a second collar portion 286. The first and second collar portions 284, 286 comprise generally annular collar portions extending radially outward from the central body portion 278. The first collar portion 284 is disposed adjacent the first end portion 280 and includes a first axial end surface 284a. The second collar portion 286 is disposed adjacent the second end portion 282 and includes a second axial end surface 286a. The axial end surfaces 284a, 286a are disposed generally parallel to the inner surfaces 222a, 224a of the cover plates 222, 224, respectively. The first axial end surface 284a faces the Inner surface 222a of the first cover plate 222. The second axial end surface 286a faces the inner surface 224a of the second cover plate 224.

With continued reference to FIG. 3, the lever 214 defines a bore 288 including a generally cylindrical central portion 290, a generally frustoconical first receiver portion 292, and a generally frustoconical second receiver portion 294. The first receiver potion 292 is disposed at the first end portion 280 of the lever 214. The second receiver portion 294 is disposed at the second end portion 282 of the lever 214. Each of the first and second receiver portions 292, 294 axially converge from the first and second end portions 280, 282, respectively, toward the central portion 290 of the bore 288, as depicted in FIG. 3, thereby defining generally frustoconical bore portions.

The lever 214 is disposed in the cavity 232 of the housing 202 such that the first end portion 280 is disposed for rotational displacement in the cylindrical bore 222b of the first cover plate 222 and the second end portion 282 is disposed for rotational displacement in the cylindrical bore 224b of the second cover plate 224. In the depicted embodiment of the actuator 200, the cylindrical bores 222b, 224b contain bushings 296 for minimizing any rotational friction between the lever 214 and the cover plates 222, 224.

As illustrated in FIGS. 2 and 3, the central body portion 278 of the lever 214 has a longitudinal dimension between the axial end surfaces 284a, 286a of the first and second collar portions 284, 286 that is less then a dimension between the inner surfaces 222a, 224a of the cover plates 222, 224 of the housing 202. As will be discussed further, this smaller axial dimension between the collar portions 284, 286 allows the lever 214 to axially displace within the cavity 232 and avoid engagement with the cover plate 224.

Figure 4:
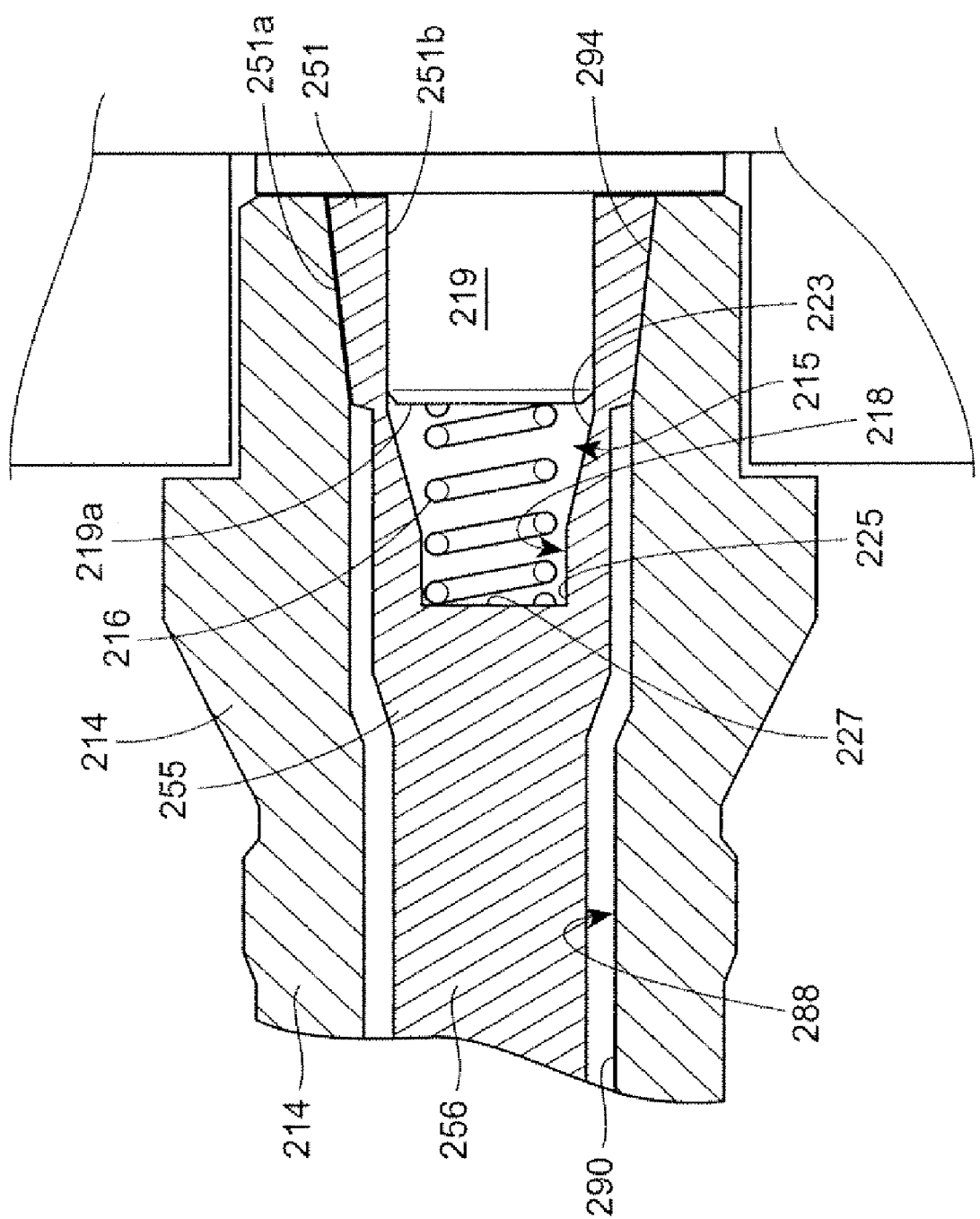
FIG. 4 is a partial cross-sectional side view of a collet and the collet biasing device of the actuator depicted in FIGS. 2 and 3.

Referring specifically to FIGS. 3 and 4, the collet 256 generally includes a rod shaped member having a recess 218, a plurality of resilient collet fingers 251, a threaded portion 253, and a shoulder 255. The collet 256 is slidably disposed within the bore 288 of the lever 214 such that the threaded portion 253 is located adjacent to and extends axially beyond the first end portion 280 of the lever 214. A diameter of the threaded portion 253 is less than a diameter of the central portion 290 and the first receiver portion 292 of the bore 288 in the lever 214. The draw nut 258 threadably engages the threaded portion 253 of the collet 256 and is adapted to tighten the collet 256 within the bore 288 to secure the rotary valve shaft 219 to the lever 214, as will be described below.

With reference to FIG. 4, the recess 218 is disposed between the collet fingers 251 and the shoulder 255 of the collet 256. In the depicted embodiment, the recess 218 comprises a transition portion 223 and a seat portion 225. The transition portion 223 comprises a generally frustoconical cavity extending axially between the collet fingers 251 and the seat portion 225. The seat portion 225 comprises a generally cylindrical cavity defining an end wall 227. The end wall 227 serves as a spring seat for the coil spring 216 of the collet biasing device 215, which, in the depicted embodiment, also engages an end wall 219a of the valve shaft 219. So configured, the collet biasing device 215 biases the collet 256 away from the valve shaft 219.

The collet fingers 251 are located adjacent to the second end portion 282 of the lever 214. The collet fingers 251 are circumferentially spaced and have outer surfaces 251a and inner surfaces 251b. The outer surfaces 251a are shaped and configured to slidably engage the second receiver portion 294 of the lever 214. More specifically, the outer surfaces 251a of the collet fingers 251 are generally shaped as partial frustoconical surfaces. Similar to the second receiver portion 294, the outer surfaces 251a of the collet fingers 251 radially converge from the second end portion 282 of the collet 256 toward the central portion 290 of the bore 288 in the lever 214. The inner surfaces 251b of the collet fingers 251 are shaped and configured to engage the rotary valve shaft 19. For example, as mentioned above, the rotary valve shaft 219 of one embodiment of a rotary valve may have a square cross-section. Accordingly, the inner surfaces 251b of the collet fingers 251 would have flat surfaces such as those depicted in FIGS. 2-4. The flat inner surfaces 251b of the collet fingers 251 are therefore adapted to engage the rotary valve shaft 219, thereby coupling the rotary shaft 219 to the drive assembly 204. While FIG. 3 only depicts the plurality of collet fingers 251 as comprising two diametrically opposed collet fingers 251, the collet 256 may include any number of circumferentially spaced collet fingers 251 capable of operating as desired.

During assembly, with the cover plates 222, 224 removed from the housing 202, the lever subassembly 208 is attached to the diaphragm subassembly 206 via the lever yoke 217 and rod end-bearing 243, as discussed above. Next, the first and second cover plates 222, 224 are fixed to the body 220 with the plurality of threaded fasteners 226 such that the first end portion 280 of the lever 214 is rotatably supported in the bore 222b of the first cover plate 222 and the second end portion 282 of the lever 214 is rotatably supported in the bore 224b in the second cover plate 224. Subsequently, the collet biasing device 215 is disposed in the recess 218 of the collet 256. In a preferred embodiment, the collet biasing device 215 includes the coil spring 216.

Once the coil spring 216 is located in the recess 218, the collet 256 containing the collet biasing device 215 can be slidably disposed within the bore 288 of the lever 214 such that portions of the collet fingers 251 extend axially outside of the second end portion 282 of the lever 214. So configured, the collet fingers 251 would be spread apart such that a dimension between the inner surfaces 251b thereof would be greater than a cross-sectional dimension of the rotary valve shaft 219. The actuator 200 would then be prepared to be coupled to the valve shaft 219.

Once the actuator 200 is assembled, the valve shaft 219 is disposed between the collet fingers 251 such that the end wall 219a of the valve shaft 219 axially engages the collet biasing device 215. So configured, the collet biasing device 215 biases the collet 256, and therefore the lever 214 into a predetermined position within the cavity 232 of the housing 202. More specifically, the collet biasing, device 215 applied an axial load between the end wall 227 of the recess 218 and the end wall 219a of the valve shaft 219. The collet 256 transfers this axial load to the lever 214 via the outer surfaces 251a of the collet fingers 251 to the second receiver portion 294 of the lever 214.

Next, the draw nut 258 is tightened on the threaded portion 253 of the collet 256. This causes the collet 256 to slidably displace within the bore 288 of the lever 214 toward the left relative to the orientation of the actuator 200 depicted in FIGS. 2-4, which further causes the lever 214 to displace to the right. Simultaneously, sliding engagement between the second receiver portion 294 of the bore 288 and the outer surfaces 251a of the collet fingers 251 causes the collet fingers 251 to displace radially inward. Thus, as the draw nut 258 is further tightened, the inner surfaces 251b of the collet fingers 251 radially and frictionally engage the valve shaft 219. The collet fingers 251 are effectively wedged between the second receiver portion 294 and the rotary valve shaft 219, thereby coupling the valve shaft 219 to the drive assembly 204.

It should be appreciated by one of ordinary skill in the art that the collet biasing device 215 provides a "centering action" on the lever 214 by biasing the collet 256 away from the valve shaft 219. Therefore, during assembly, a predetermined amount of axial compliance in the lever position results. That is, by providing positional compliance to the collet 256 and the lever 214 during tightening, a slight axial deflection or translation can occur during engagement of the collet 256 with the valve shaft 219. The slight translation, which is proportional to the tolerance between the axial end surfaces 284a, 286a of the lever 214 and tie inner surfaces 222a, 224a of the end plates, respectively, substantially prevents the lever 214 from being drawn tight or immediately adjacent to the inner surface 224a of the second cover plate 224. Additionally biasing the collet 256 away from the valve shaft 219 ensures appropriate relative positioning therebetween to minimize tension imparted on the valve shaft 219 due to the tightening.

While the collet biasing device 215 has been disclosed as comprising the coil spring 216, it should be appreciated that other biasing devices are included within the scope of the present application. For example, an alternative collet biasing device 215 may include a wave spring, a curved spring, or any other metallic or non-metallic device such as a resilient ball or structure made of a rubber, an elastomeric material, or any other resilient or deformable material.

Further yet, while the collet positioning device 215 of the disclosed embodiment is disposed between the end wall 227 of the recess 218 in the collet 256 and the end wall 219a of the valve shaft 219, an alternative embodiment of the valve shaft 219 may also include a recess Such a recess in the valve shaft 219 may receive a portion of the collet biasing devise 215 in a manner similar to the seat portion 225 of the recess 218 in the collet 256. Another alternative embodiment of the valve shaft 219 may include a pin or other protrusion extending axially from the end wall 219a and adapted to receive the collet biasing device 215 thereon. Such a recess or pin formed with the valve shaft 219 may help locate the collet biasing device 215 relative to the collet 256.

Further still, while the collet 256 and collet biasing device 215 have been described herein as being incorporated into a rotary valve actuator 200, their implementation is not limited to rotary valve actuators, but rather may be incorporated into any linear drive actuator or any other type of actuator.

Furthermore, while the collet 256 has been described thus far as being disposed within the bore 288 of the lever 214 such that the plurality of collet fingers 251 are located adjacent to the second receive portion 294, it should be appreciated that the configuration may be reversed such that the plurality of collet fingers 251 of the collet 256 are located adjacent to and in engagement with the first receiver portion 292. So configured, the lever subassembly 208 may he secured to a valve shaft on the left relative to the orientation of the actuator 200 depicted in the FIGS. Accordingly, the lever subassembly 208 including the collet 256 and the collet biasing device 215 are reversible.

In light of the foregoing it should he appreciated that the present disclosure provides a rotary valve actuator having a lever that is rotatable within a housing thereof. Specifically, the present disclosure provides an actuator including a positioning device that is operable to bias, force, or otherwise locate the lever in a predetermined position, thereby ensuring an appropriate relationship exists between the actuator and the rotary valve and, particularly, the rotary valve shaft. In one embodiment, the predetermined position to which the positioning device biases the lever includes a substantially centered position within the housing of the actuator. In another embodiment, the predetermined position includes positioning the lever out of engagement with the cover plates of the housing and/or any other component of the actuator assembly which may interfere with appropriate displacement of the lever within the housing and/or the operation of the valve. Thus, the predetermined position need not be a centered position within the housing, but rather may be positioned anywhere relative to the housing to alleviate friction generated between the lever and the housing, or tension, compression, or any other undesirable stresses on the valve shaft.

What is claimed:

1. A valve actuator for being coupled to a valve shaft, comprising:
   a housing;
   a lever disposed within the housing and adapted to be operatively coupled to rotate the valve shaft;
   a collet carried by the lever and adapted to couple the lever to the valve shaft; and
   a biasing device disposed adjacent to an axial end of the collet and operatively engaging the valve shaft to bias the lever into a predetermined position.

2. The valve actuator of claim 1, wherein the biasing device is disposed between a portion of the collet and the valve shaft.

3. The valve actuator of claim 1, wherein the biasing device comprises at least one spring biasing the collet away from the valve shaft.

4. The valve actuator of claim 1, wherein the biasing device comprises a coil spring in engagement with the collet and the valve shaft.

5. The valve actuator of claim 1, wherein the collet comprises a recess receiving biasing device.

6. The valve actuator of claim 5, wherein the recess further receives at least a portion of the valve shaft.

7. The valve actuator of claim 1, wherein the collet comprises a plurality of collet fingers disposed adjacent the biasing device and adapted to operatively couple the collet to the valve shaft.

8. The valve actuator of claim 1, wherein the lever comprises an axial dimension that is smaller than a dimension of the housing to enable axial displacement of the lever within the housing.

9. The valve actuator of claim 1, wherein the lever comprises an elongated bore supporting the collet for sliding displacement relative to the lever.

10. A device for coupling an actuator to a valve shaft of a rotary valve, the device comprising:
    a housing arranged for connection to the rotary valve adjacent the rotary valve shaft;

a lever rotatably disposed within the housing and adapted to be operatively coupled to the valve shaft;

a collet carried by the lever and adapted to couple the lever to the valve shaft; and a spring in engagement with the collet and the valve shaft.

11. The device of claim 10, wherein the spring biases the collet away from the valve shaft.

12. The device of claim 10, wherein the spring comprises a coil spring.

13. The device of claim 10, wherein the collet comprises a recess receiving at least a portion of the spring.

14. The device of claim 13, wherein the recess further receives at least a portion of the valve shaft.

15. The device of claim 10, wherein the collet comprises a plurality of collet fingers disposed adjacent the spring and adapted to operatively couple the collet to the valve shaft.

16. The device of claim 10, wherein the lever comprises an axial dimension that is smaller than a dimension of the housing to enable axial displacement of the lever within the housing.

17. The device of claim 10, wherein the lever comprises an elongated bore supporting the collet for sliding displacement relative to the lever.

18. A device for coupling an actuator to a valve shaft of a rotary valve, the device comprising:

a housing arranged for connection to the rotary valve adjacent the rotary valve shaft;

a lever rotatably disposed within the housing and including a through-bore;

a collet slidably disposed within the through-bore of the lever and including a plurality of collet fingers and an axial recess, the plurality of collet fingers disposed adjacent the axial recess and adapted to engage the valve shaft of the rotary valve; and a spring disposed within the axial recess in the collet and between the collet and the valve shaft to bias the collet away from the valve shaft.

19. The device of claim 18, wherein the spring further biases the lever away from the valve shaft.

20. The device of claim 18, wherein the spring comprises a coil spring.

21. The device of claim 18, wherein the lever comprises an axial dimension that is smaller than a dimension of the housing to enable axial displacement of the lever within the housing.

* * * * *